United States Patent
Hsieh

(10) Patent No.: US 7,996,697 B2
(45) Date of Patent: Aug. 9, 2011

(54) MATCHING SYSTEM OF ELECTRONIC DEVICE AND PERIPHERAL DEVICE AND MATCHING METHOD THEREOF

(75) Inventor: Hong-Ming Hsieh, Kaohsiung (TW)

(73) Assignee: Getac Technology Corporation, Hsinchu (TW)

(*) Notice: Subject to any disclaimer, the term of this patent is extended or adjusted under 35 U.S.C. 154(b) by 769 days.

(21) Appl. No.: 11/966,695

(22) Filed: Dec. 28, 2007

(65) Prior Publication Data

US 2008/0294922 A1    Nov. 27, 2008

(30) Foreign Application Priority Data

May 25, 2007    (CN) .................... 2007 1 0028213

(51) Int. Cl.
    *G06F 1/00*    (2006.01)
(52) U.S. Cl. ........ 713/324; 713/300; 713/330; 710/100; 710/305; 710/303
(58) Field of Classification Search .......... 713/320–330, 713/340; 710/301–306, 100
    See application file for complete search history.

(56) References Cited

U.S. PATENT DOCUMENTS

| | | | |
|---|---|---|---|
| 7,401,162 B2* | 7/2008 | Baker et al. ................. 710/8 |
| 2002/0136426 A1* | 9/2002 | Davis et al. ................. 382/100 |
| 2006/0136647 A1* | 6/2006 | Do et al. ................. 710/304 |
| 2007/0294430 A1* | 12/2007 | Narayanan et al. .......... 709/245 |

* cited by examiner

*Primary Examiner* — Paul Myers
*Assistant Examiner* — Kim T Huynh

(57) ABSTRACT

A matching system of an electronic device and a perpheral device and a matching method thereof are described. The system includes and electric device, having an identification mechanism for identifying a specific identification code and generating a control signal or a control instruction according to an identification result; and a peripheral device, electrically coupled to the electronic device selectively. The peripheral device includes an identification code unit for storing a group identification code; and a power control unit, for controlling an operation state of the peripheral device according to the control signal or the control instruction, when the peripheral device is electrically coupled to the electronic device. If the identification result is that the specific identification code is consistent with the group identification code, the power control unit controls the entire peripheral device to work normally according to the control signal or the control instruction.

19 Claims, 2 Drawing Sheets

MATCHING SYSTEM OF ELECTRONIC DEVICE AND PERIPHERAL DEVICE AND MATCHING METHOD THEREOF

CROSS-REFERENCE TO RELATED APPLICATIONS

This non-provisional application claims priority under 35 U.S.C. §119(a) on Patent Application No(s). 200710028213.5 filed in China on May 25, 2007, the entire contents of which are hereby incorporated by reference.

BACKGROUND OF THE INVENTION

1. Field of the Invention

The present invention relates to a matching system of a device and a matching method thereof. More particularly, the present invention relates to a matching system of an electronic device and a peripheral device and a matching method thereof.

2. Related Art

With the designing trend of being light, thin, short, and small, notebook computer becomes increasingly small in volume. However, due to the size limits of some mechanical parts, the volume of the notebook computer still has a certain limit. Therefore, in order to reduce the volume of the notebook computer and meanwhile to provide the notebook computer with the functions the same as that of desktop computers, a peripheral device is developed, for example, a docking station. The docking state is formed by connection ports of various interface specifications, for example, universal serial bus (USB), PS/2 port, IEEE1394, parallel port, serial port, Ethernet port (RJ-45), and disk driver etc. Through a design manner of separating the docking station from the notebook computer, the weight and the volume of the notebook computer can be greatly reduced, and if the user needs to connect the notebook computer to the peripheral device, it is only necessary to install the notebook computer on the docking station, so as to perform data transmission with the peripheral device, or to perform charging operation for the notebook computer. However, after the docking station has been proposed, it is easy for each competitive manufacturer to obtain the docking station. Therefore, each manufacturer generally utilizes the compatible product appeal, which influences the market share of the notebook computer and the docking station. Therefore, a circuit design capable of increasing the difficulty for the competitive manufacturers to utilize the compatible product appeal to occupy the market is required, so as to assure that their respectively products have certain uniqueness, and thus, have preferred product competitiveness.

SUMMARY OF THE INVENTION

In view of the above problem, the present invention is mainly directed to a matching system of an electronic device and a peripheral device and a matching method thereof, which are capable of assuring the product to have a certain uniqueness and thus having preferred product competitiveness by using an identification mechanism to control the completeness of the using functions for the peripheral device.

A matching system of an electronic device and a peripheral device is provided according to the present invention, which includes:

an electric device, having an identification mechanism for identifying a specific identification code and generating a control signal or a control instruction according to an identification result;

a peripheral device, electrically coupled to the electronic device selectively, and including an identification code unit for storing a group identification code; a power control unit, for controlling an operation state of the peripheral device according to the control signal or the control instruction, when the peripheral device is electrically coupled to the electronic device; in which if the identification result is that the specific identification code is consistent with the group identification code, the power control unit controls the entire peripheral device to work normally according to the control signal or the control instruction.

A method for matching an electronic device with a peripheral device is provided according to the present invention, which includes the following steps. Firstly, after the electronic device is electrically coupled to the peripheral device, the electronic device detects whether a group identification code exists in the peripheral device or not. Next, if the electronic device confirms that the group identification code exists, a part of operation powers for the peripheral device are turned on. Then, if the electronic device confirms that the group identification code is consistent with a specific identification code, all the operation powers for the peripheral device are turned on.

Through the matching system of the electronic device and the peripheral device and the matching method thereof, the transmission interface of a system management (SM) bus is adopted to perform identification procedures for the electronic device and the peripheral device, and merely two signal lines (a data signal line and a clock signal line) are required for finishing the process, so the entire identification circuit does not have an excessively high manufacturing cost, and in this manner, the products are assured to have certain uniqueness, and thus having preferred product competitiveness.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
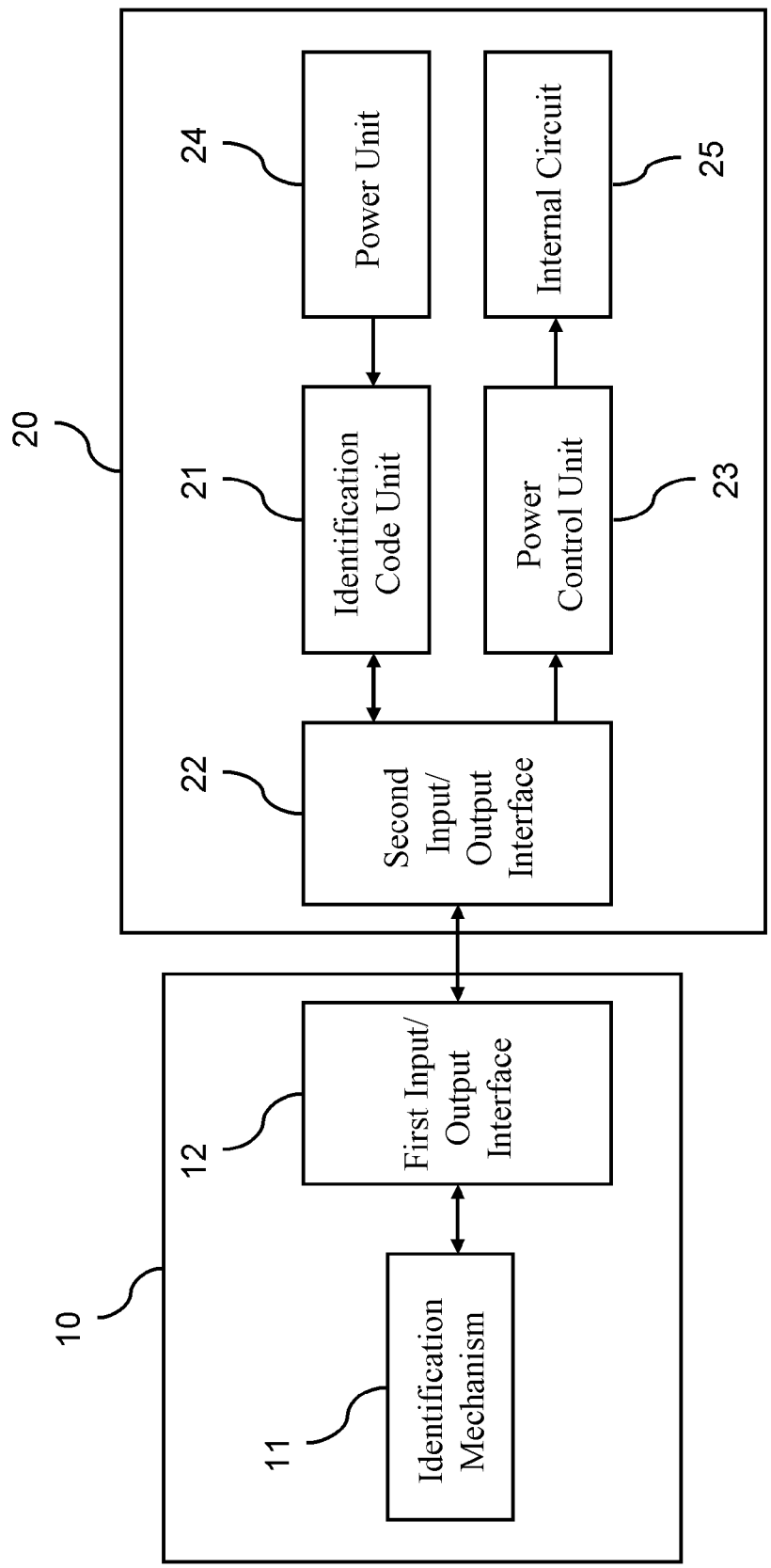
FIG. 1 is a block diagram of a system according to an embodiment of the present invention.

Referring to FIG. 1, it is a block diagram of a system according to an embodiment of the present invention. As shown in FIG. 1, the matching system of the electronic device and the peripheral device in the present invention includes an electronic device 10 and a peripheral device 20.

The electronic device 10 has an identification mechanism 11 for identifying a specific identification code and generating a control signal or a control instruction according to an identification result, in which the identification mechanism 11 may be, for example, an embedded controller (EC) or a software program. The specific identification code is pre-stored in the electronic device by the manufacturer of the electronic device 10, and it is provided for the electronic device 10 to identify the exclusive peripheral device 20. The electronic device 10 may be, for example, an information processing device (e.g., desktop computer), a portable information processing device (e.g., notebook computer or personal digital assistant, etc.), or a mobile communication device (e.g., global positioning device or mobile phone etc.), and the electronic device 10 is electrically coupled to a second input/output interface 22 of the peripheral device 20 through a first input/output interface 12.

The first input/output interface 12 is disposed on the electronic device 10, for serving as a signal transmission interface of the electronic device 10, and the first input/output interface 12 may be, for example, an USB interface, a parallel transmission interface, or a serial transmission interface (e.g., RS-232). In addition, those skilled in the art may easily know that, the first input/output interface 12 and the second input/output interface 22 may, for example, mutually transmit signals or data through a wireless transmission manner. At this time, the electronic device 10 may be not electrically coupled to the peripheral device 20.

The peripheral device 20 may be electrically coupled to the electronic device 10 selectively, and includes an identification code unit 21, a second input/output interface 22, a power control unit 23, a power unit 24, and an internal circuit 25. The peripheral device 20 may be, for example, a docking station having at least one signal input/output connection interface for expanding a signal input/output connection interface for the electronic device 10, or may be a keyboard, a mouse, or a data storage medium, etc.

The identification code unit 21 is electrically coupled to the second input/output interface 22, and stores a group identification code. The identification code is pre-stored in the peripheral device 20 by the manufacturers of the peripheral device 20, and it is provided for the electronic device 10 to identify the exclusive peripheral device 20. The identification mechanism 11 continuously identifies the group identification code in the identification code unit 21 within a predetermined time period, so as to assure the matching system to work normally. The identification code unit 21 is electrically coupled to the identification mechanism 11 of the electronic device 10 through the SM bus. The identification code unit 21 may be a non-volatile memory (e.g., an erasable programmable read-only memory (EPROM), an electrically erasable programmable read only memory (EEPROM), or a flash memory.

The second input/output interface 22 is disposed on the peripheral device 20 to serve as a signal transmission interface for the peripheral device 20, and the second input/output interface 22 may be, for example, an USB interface, a parallel transmission interface, or a serial transmission interface (e.g., RS-232).

The power control unit 23, electrically coupled to the second input/output interface 22, is used to control the operation state of the peripheral device 20 according to the control signal or the control instruction generated by the identification mechanism 11 when the peripheral device 20 is electrically coupled to the electronic device 10.

The power unit 24 is electrically coupled to the identification code unit 21, for supplying the electrical power required by the operations of the identification code unit 21, in which the power unit 24 may be for example a common cell or a rechargeable cell.

The internal circuit 25, electrically coupled to the power control unit 23, serves as a functional circuit for the peripheral device 20, for example, an USB interface driving circuit, a disk driver driving circuit, a wireless signal sending circuit, a display interface driving circuit, a sound interface driving circuit, or a heat sink driving circuit, etc.

In the following, the action principle for each unit and circuit is described below.

After the electronic device 10 is electrically coupled to the peripheral device 20 through the first input/output interface 12 and the second input/output interface 22, the identification mechanism 11 detects whether an identification code consistent with the specific identification code exists in the identification code unit 21 or not. If the identification result is that the specific identification code is consistent with the identification code in the identification code unit 21, the power control unit 23 controls all the internal circuits 25 of the peripheral device 20 to work normally according to the control signal or the control instruction.

If the identification result is that the specific identification code is not consistent with the identification code in the identification code unit 21, the power control unit 23 controls a part of the internal circuits 25 of the peripheral device 20 to work normally according to the control signal or the control instruction.

If the identification result is that no identification codes exist in the identification code unit 21, or if it cannot detect the identification code unit 21, the power control unit 23 controls all the internal circuits 25 of the peripheral device 20 to stop working according to the control signal or the control instruction.

Figure 2:
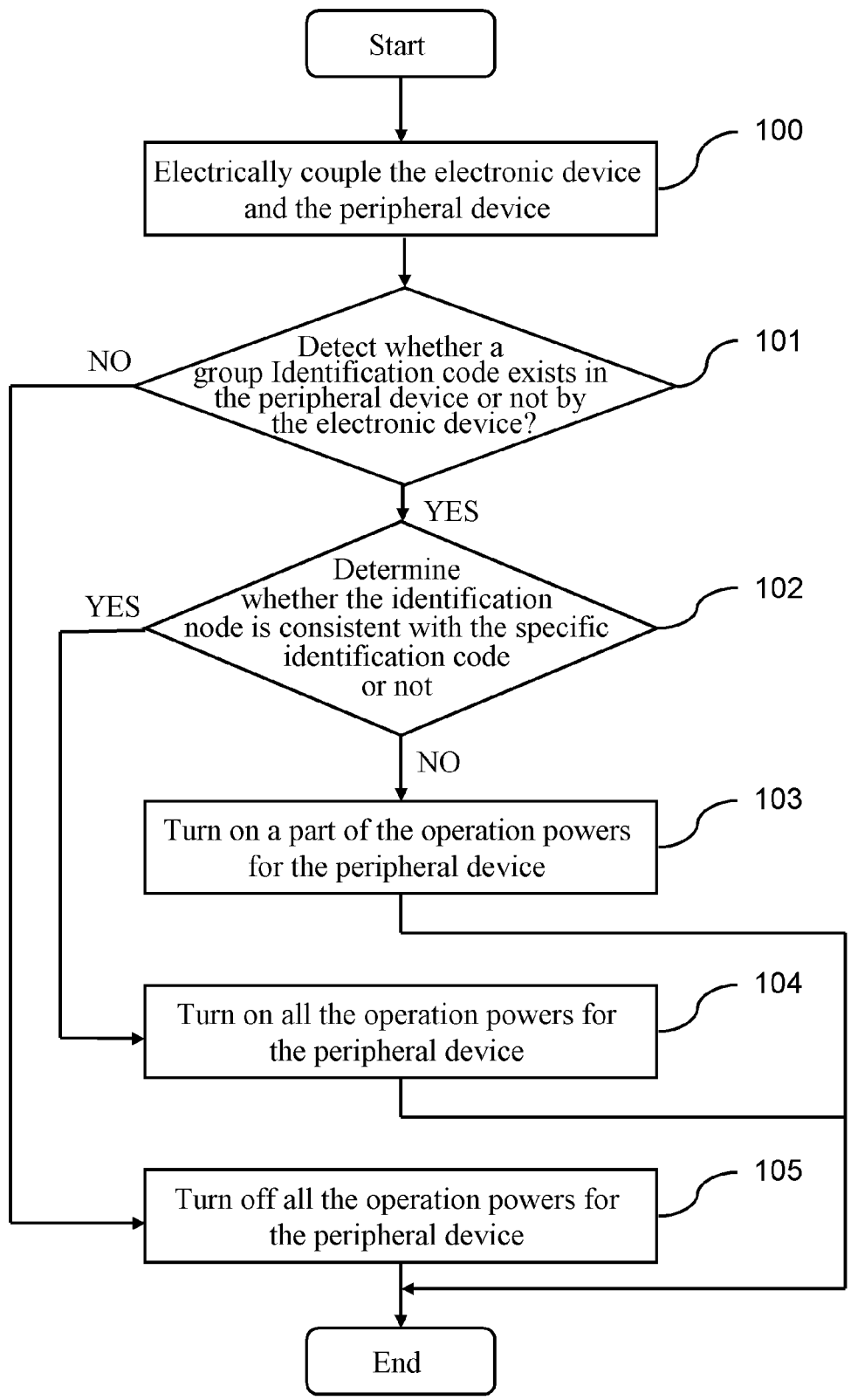
FIG. 2 is a flow chart of an embodiment of the present invention.

Referring to FIG. 2, it is a flow chart of an embodiment of the present invention. As shown in FIG. 2, the method for matching the electronic device with the peripheral device of the present invention includes the following steps.

Firstly, the electronic device is electrically coupled to the peripheral device (Step 100), in which the electronic device may be, for example, electrically coupled to the peripheral device through the first input/output interface and the second input/output interface. In addition, those skilled in the art can easily know that, the first input/output interface and the second input/output interface may, for example, mutually transmit signals or data through a wireless transmission manner. At this time, the electronic device and the peripheral device in Step 100 may be not electrically coupled to each other.

Next, after the electronic device is electrically coupled to the peripheral device, the electronic device detects whether a group identification code exists in the peripheral device or not (Step 101), in which the electronic device may, for example, detect whether the identification code unit for storing the identification codes exists in the peripheral device or not through the SM bus, so as to perform the determining procedure.

Next, if it is confirmed that the identification code exists in the electronic device, it is further determined whether the identification code in the peripheral device is consistent with the specific identification code or not (Step 102). If the electronic device confirms that the identification code is not consistent with the specific identification code, a part of the operation powers for the peripheral device are turned on (Step 103), in which the electronic device generates the control signal or the control instruction to the power control unit in the peripheral device, so as to turn on a part of the power switches, thereby driving a part of the internal circuits in the peripheral device to work normally. If the electronic device confirms that the identification code is consistent with the specific identification code, all the operation powers of the peripheral device are turned on (Step 104), in which the electronic device generates the control signal or the control instruction to the power control unit in the peripheral device, so as to turn on all the power switches, thereby driving all the internal circuits in the peripheral device to work normally.

If the electronic device confirms that no identification codes exist in the peripheral device, all the operation powers of the peripheral device are turned off (Step 105), in which the electronic device generates the control signal or the control instruction to the power control unit in the peripheral device, so as to turn off all the power switches, thereby making all the internal circuits in the peripheral device stop working.

To sum up, in the matching system of the electronic device and the peripheral device and the matching method thereof in the present invention, the transmission interface of the SM bus is adopted to perform the identification procedure for the electronic device and the peripheral device, and only two signal lines (the data signal line and the clock signal line) are required for finishing the process, so the entire identification circuit does not have an excessively high manufacturing cost, and in this manner, the products manufactured by each manufacturer are assured to have certain uniqueness, and thus having preferred product competitiveness.

What is claimed is:

1. A matching system of an electronic device and a peripheral device, comprising:
    an electronic device, having an identification mechanism, for identifying a specific identification code, and generating a control signal or a control instruction according to an identification result; and
    a peripheral device, electrically coupled to the electronic device selectively, comprising:
        an identification code unit, for storing a group identification code; and
        a power control unit, for controlling an operation state of the peripheral device according to the control signal or the control instruction, when the peripheral device is electrically coupled to the electronic device;
    configured such that if the identification result is that the specific identification code is consistent with the group identification code, the power control unit controls the entire peripheral device to work normally according to the control signal or the control instruction.

2. The matching system of an electronic device and a peripheral device as claimed in claim 1, wherein the identification mechanism is an embedded controller (EC).

3. The matching system of an electronic device and a peripheral device as claimed in claim 1, wherein the identification mechanism is a software program.

4. The matching system of an electronic device and a peripheral device as claimed in claim 1, wherein the peripheral device is a docking station having at least one signal input/output connection interface, for expanding a signal input/output connection interface of the electronic device.

5. The matching system of an electronic device and a peripheral device as claimed in claim 1, wherein the peripheral device further comprises a power unit electrically coupled to the identification code unit, for supplying an electrical power required by operations of the identification code unit.

6. The matching system of an electronic device and a peripheral device as claimed in claim 1, wherein the identification code unit is electrically coupled to the identification unit through a system management (SM) bus.

7. The matching system of an electronic device and a peripheral device as claimed in claim 1, wherein if the identification result is that the specific identification code is not consistent with the group identification code, the power control unit controls a part of the peripheral device to work normally according to the control signal or the control instruction.

8. The matching system of an electronic device and a peripheral device as claimed in claim 1, wherein if the identification result is that the specific identification code and the group identification code do not exist in the peripheral device, the power control unit controls the peripheral device to entirely stop working according to the control signal or the control instruction.

9. The matching system of an electronic device and a peripheral device as claimed in claim 1, wherein the identification unit continuously identifies the group identification code within a predetermined time period, so as to assure the matching system to work normally.

10. A method for matching an electronic device with a peripheral device, comprising:
    detecting whether a group identification code exists in the peripheral device or not by the electronic device, after the electronic device is electrically coupled to the peripheral device;
    turning on a part of operation powers for the peripheral device, when the electronic device confirms that the group identification code exists; and
    turning on all the operation powers for the peripheral device, when the electronic device confirms that the group identification code is consistent with a specific identification code.

11. The method for matching an electronic device with a peripheral device as claimed in claim 10, wherein when the electronic device confirms that the group identification code does not exist, all the operation powers for the peripheral device are turned off.

12. The method for matching an electronic device with a peripheral device as claimed in claim 10, wherein the electronic device detects the group identification code in the peripheral device through an SM bus.

13. The matching system of an electronic device and a peripheral device as claimed in claim 1, configured such that the power control unit controls the entire peripheral device to work normally by turning on all of a plurality of power switches of the peripheral device.

14. The matching system of an electronic device and a peripheral device as claimed in claim 7, configured such that the power control unit controls part of the peripheral device to work normally by turning on some but not all of a plurality of power switches of the peripheral device.

15. The matching system of an electronic device and a peripheral device as claimed in claim 8, configured such that the power control unit controls the peripheral device to entirely stop working by turning off all of a plurality of power switches of the peripheral device.

16. A matching system of an electronic device and a peripheral device, comprising:
    an electronic device, having an identification mechanism configured to identify a specific identification code and generate a control signal or a control instruction according to an identification result; and
    a peripheral device, electrically coupled to the electronic device selectively, comprising:
        an identification code unit storing a group identification code; and
        a power control unit configured to control an operation state of the peripheral device according to the control signal or the control instruction when the peripheral device is electrically coupled to the electronic device;
    configured such that if the identification result is that the specific identification code is consistent with the group identification code, the power control unit controls the entire peripheral device to work normally according to the control signal or the control instruction, and if the identification result is that the specific identification code is not consistent with the group identification code, the power control unit controls a part but not the entirety of the peripheral device to work normally according to the control signal or the control instruction, and if the identification result is that the specific identification code and the group identification code do not exist in the peripheral device, the power control unit controls the peripheral device to entirely stop working according to the control signal or the control instruction.

17. The matching system of an electronic device and a peripheral device as claimed in claim 16, configured such that the power control unit controls the entire peripheral device to work normally by turning on all of a plurality of power switches of the peripheral device.

18. The matching system of an electronic device and a peripheral device as claimed in claim 16, configured such that the power control unit controls part of the peripheral device to work normally by turning on some but not all of a plurality of power switches of the peripheral device.

19. The matching system of an electronic device and a peripheral device as claimed in claim 16, configured such that the power control unit controls the peripheral device to entirely stop working by turning off all of a plurality of power switches of the peripheral device.

* * * * *